United States Patent [19]

Kanota et al.

[11] Patent Number: 5,384,666
[45] Date of Patent: Jan. 24, 1995

[54] DIGITAL PICTURE SIGNAL RECORDING APPARATUS IN WHICH A FIELD INTERVAL IS RECORDED IN A PLURALITY OF TRACKS EXHIBITING A TRACK PITCH NO GREATER THAN 5.5 μM BY A ROTARY DRUM HAVING A DIAMETER NO GREATER THAN 25MM AND A ROTARY SPEED NO LESS THAN 150 RPS

[75] Inventors: Keiji Kanota, Kanagawa; Hajime Inoue, Tokyo; Akihiro Uetake, Tokyo; Moriyuki Kawaguchi, Tokyo; Yukio Kubota, Kanagawa; Kazunobu Chiba, Miyagi, all of Japan

[73] Assignee: Sony Corporation, Tokyo, Japan

[21] Appl. No.: 768,871
[22] PCT Filed: Jun. 5, 1991
[86] PCT No.: PCT/JP91/00755
  § 371 Date: Oct. 29, 1991
  § 102(e) Date: Oct. 29, 1991
[87] PCT Pub. No.: WO92/09073
  PCT Pub. Date: May 29, 1992

[30] Foreign Application Priority Data

Nov. 14, 1990 [JP] Japan .................... 2-307508

[51] Int. Cl.⁶ .................... G11B 5/09; H04N 5/78
[52] U.S. Cl. .................... 360/32; 360/33.1
[58] Field of Search .................... 360/32, 35.1, 46, 33.1; 358/335, 135

[56] References Cited

U.S. PATENT DOCUMENTS

| 4,290,087 | 9/1981 | Bixby et al. | 360/35.1 |
| 4,567,535 | 6/1986 | Kinjo | 360/35.1 |
| 4,845,560 | 7/1989 | Kondo et al. | 358/135 |
| 4,862,292 | 8/1989 | Euari et al. | 358/335 |
| 4,947,249 | 8/1990 | Kondo | 358/135 |
| 5,063,453 | 11/1991 | Yoshimura et al. | 360/32 |
| 5,122,912 | 6/1992 | Kausta et al. | 360/46 |
| 5,170,298 | 12/1992 | Fukami et al. | 360/32 |

FOREIGN PATENT DOCUMENTS

| 59-119519 | 7/1984 | Japan . |
| 61-144989 | 7/1986 | Japan . |
| 61-147689 | 7/1986 | Japan . |
| 62-262208 | 11/1987 | Japan . |
| 63-306504 | 12/1988 | Japan . |
| 1307003 | 12/1989 | Japan . |

OTHER PUBLICATIONS

Design Considerations for the D-2 NTSC Composite DVTR, pp. 182–193, SMPTE Journal, Mar. 1988, Richard Brush.

Primary Examiner—Donald Hajec
Assistant Examiner—T. N. Forbus, Jr.
Attorney, Agent, or Firm—William S. Frommer; Alvin Sinderbrand

[57] ABSTRACT

A magnetic recording apparatus of a digital picture signal comprising a block segmenting circuit for converting an input digital picture signal into data segmented by blocks composed of a plurality of picture elements, an encoding circuit for compressing and encoding the output data of the block segmenting circuit by blocks, and a channel encoding circuit for channel encoding the encoded output data from the encoding circuit, wherein the output data from the channel encoding circuit is recorded on a magnetic tape by a magnetic head mounted on a rotation drum, and wherein the magnetic recording apparatus of digital picture data is characterized in that the track pitch formed on the magnetic tape by the magnetic head is 5.5 μm or less, the diameter of the rotary drum is 25 mm or less, and the rotating speed of the rotary drum is 150 rps or more, the track length per unit time is set to particular value thereby.

5 Claims, 8 Drawing Sheets

DIGITAL PICTURE SIGNAL RECORDING APPARATUS IN WHICH A FIELD INTERVAL IS RECORDED ON A PLURALITY OF TRACKS EXHIBITING A TRACK PITCH NO GREATER THAN 5.5 μM BY A ROTARY DRUM HAVING A DIAMETER NO GREATER THAN 25MM AND A ROTARY SPEED NO LESS THAN 150 RPS

TECHNICAL FIELD

The present invention relates to an apparatus for recording a digital picture signal such as a digital video signal on a magnetic tape, more specifically, relates to a magnetic recording apparatus of a digital picture signal which can record the signal for a long time by selecting the azimuth angle of the magnetic head to particular values.

BACKGROUND ART

A D1 format component type digital VTR and a D2 format composite type digital VTR both of which are used in broadcasting stations have been practically used as digital VTRs for digitalizing color video signals and recording them on a recording medium such as a magnetic tape.

In the former D1 format digital VTR, a luminance signal and first and second color difference signals are A/D converted with sampling frequencies of 13.5 MHz and 6.75 MHz, respectively. Thereafter, the signals are processed in a particular manner and then recorded on a tape. Since the ratio of sampling frequencies of components is 4:2:2, this system is also named the 4:2:2 system.

On the other hand, in the latter D2 format video digital VTR, a composite video signal is sampled with a signal with a frequency 4 times higher than the frequency fsc of a color subcarrier signal and then A/D converted. Thereafter, the resultant signal is processed in a particular manner and then recorded on a magnetic tape.

Since these VTRs are designed for use in broadcasting stations, the top priority of them is in picture quality. In these VTRs, a digital color video signal where one sample is A/D converted into for example 8 bits is recorded without substantially being compressed.

As an example, the data amount of the former D1 format digital VTR will be described in the following.

When each sample is A/D converted into 8 bits with the above mentioned frequency, the information amount of a color video signal is approximately 216 Mbps (megabits per second). When the data in the horizontal an vertical blanking intervals are removed, the number of effective picture elements of the luminance signal per horizontal interval and the number of effective picture elements of each color difference signal per horizontal interval become 720 and 360, respectively. Since the number of effective scanning lines for each field in the NTSC system (525/60) is 250, the data amount Dv of picture signal per second can be expressed as follows.

$$Dv = (720 + 360 + 360) \times 8 \times 250 \times 60 = 172.8 \text{ Mbps}$$

Even in the PAL system (625/50), since the number of effective scanning lines for each field is 300 and the number of fields per second is 50, it is obvious that the data amount in the PAL system is the same as that in the NTSC system. By considering the redundant components necessary for error correction and format with respect to such data, the bit rate of picture data becomes approximately 205.8 Mbps in total.

In addition, the data amount of audio data Da is approximately 12.8 Mbps while the additional data Do such as a gap, a preamble, and a postamble used in editing is approximately 6.6 Mbps. Thus, the information amount of overall record data can be expressed by the following equation.

$$Dt = Dv + Da + Do$$
$$= 172.8 + 12.8 + 6.6 = 192.2 \text{ Mbps}.$$

To record the above mentioned information amount, with respect to the D1 format digital VTR, a segment system having a track pattern with fields of 10 tracks in the NTSC system, and with fields of 12 tracks in the PAL system has been employed.

In addition, a recording tape with a width of 19 mm is used. There are two types of recording tapes in thickness, which are of 13 μm type and 16 μm type. To house these tapes, there are three types of cassettes, which are of large type (L), middle type (M), and small type (S). The information data is recorded on such tapes in the above mentioned format. Thus, the data recording density is approximately 20.4 μm²/bit. When the recording density is high, an error tends to take place in the playback output data due to interference between codes or non-linearity of electromagnetic conversion system of the head and tape. Thus far, even if the error correction encoding was performed, the above mentioned value was the limit as the recording density.

By putting all the above mentioned parameters together, the playback time of the cassette in each size of the digital VTR in the D1 format can be tabulated as follows.

| Size/tape thickness thick | 13 μm thick | 16 μm |
|---|---|---|
| S | 13 minutes | 11 minutes |
| M | 42 minutes | 34 minutes |
| L | 94 minutes | 76 minutes |

As was described above, although the D1 format digital VTR can satisfactorily provide high picture quality for use in broadcasting stations, even if a large cassette housing a tape with a thickness of 19 mm is used, the playback time is at most 1.5 hours. Thus, such a VTR cannot be adequately used for a home use VTR. In order to increase the data recording density, it is effective to reduce the track pitch. However, in the conventional VTRs, error in reproducing data increase because of nonlinearity of track, tracking error, etc., so that it is limited to reduce the track pitch. In particular, it is difficult to guarantee the compatibility among VTRs.

On the other hand, as home use VTRs, the β system, the VHS system, the 8-mm system, and so forth have been practically used. However, in each of them, data is recorded and playback with analog signals. Thus, although their picture qualities have been satisfactorily improved, for example, when data which was imaged and recorded with a camera is dubbed and copied, the picture quality is remarkably degraded. Thus, when the data is dubbed several times, the picture quality will become intolerable to the viewers.

DISCLOSURE OF INVENTION

Therefore, an object of the present invention is to provide a recording apparatus of a digital picture signal which can reduce the track pitch resulting from good track linearity and tracking ability.

Another object of the present invention is to provide a recording apparatus of a digital picture signal which can dub a plurality of times without deterioration of the picture quality.

The present invention is a magnetic recording apparatus of a digital picture signal comprising a block segmenting circuit (5, 6) for converting an input digital picture signal into data segmented by blocks composed of a plurality of picture elements, an encoding circuit (8) for compressing and encoding the output data of the block segmenting circuit (5, 6) by blocks, and a channel encoding circuit (11) for channel encoding the encoded output data from the encoding circuit (8), wherein the output data from the channel encoding circuit (11) is recorded on a magnetic tape (78) by a magnetic head (13A, 13B) mounted on a rotation drum (76), and wherein the magnetic recording apparatus of digital picture data is characterized in that the track length per unit time is set to particular value by the track pitch formed on the magnetic tape by the magnetic head (13A, 13B) is 5.5 μm or less, the diameter of the rotary drum (76) is 25 mm or less, and the rotating speed of the rotary drum (76) is 150 rps or more.

Since the improvement of the track linearity and the reduction of the tracking error are reached, tracks can be formed by narrow track pitch without guardband and a long time recording operation can be performed.

BEST MODE FOR CARRYING OF THE INVENTION

Now, an embodiment according to the present invention will be described in the following order.

a. Signal process portion
b. Block encoding
c. Channel encoder and channel decoder
d. Head and tape system
e. Electromagnetic conversion system a. Signal process portion

First, a signal process portion of a digital VTR of an embodiment according to the present invention will be described.

Figure 1:
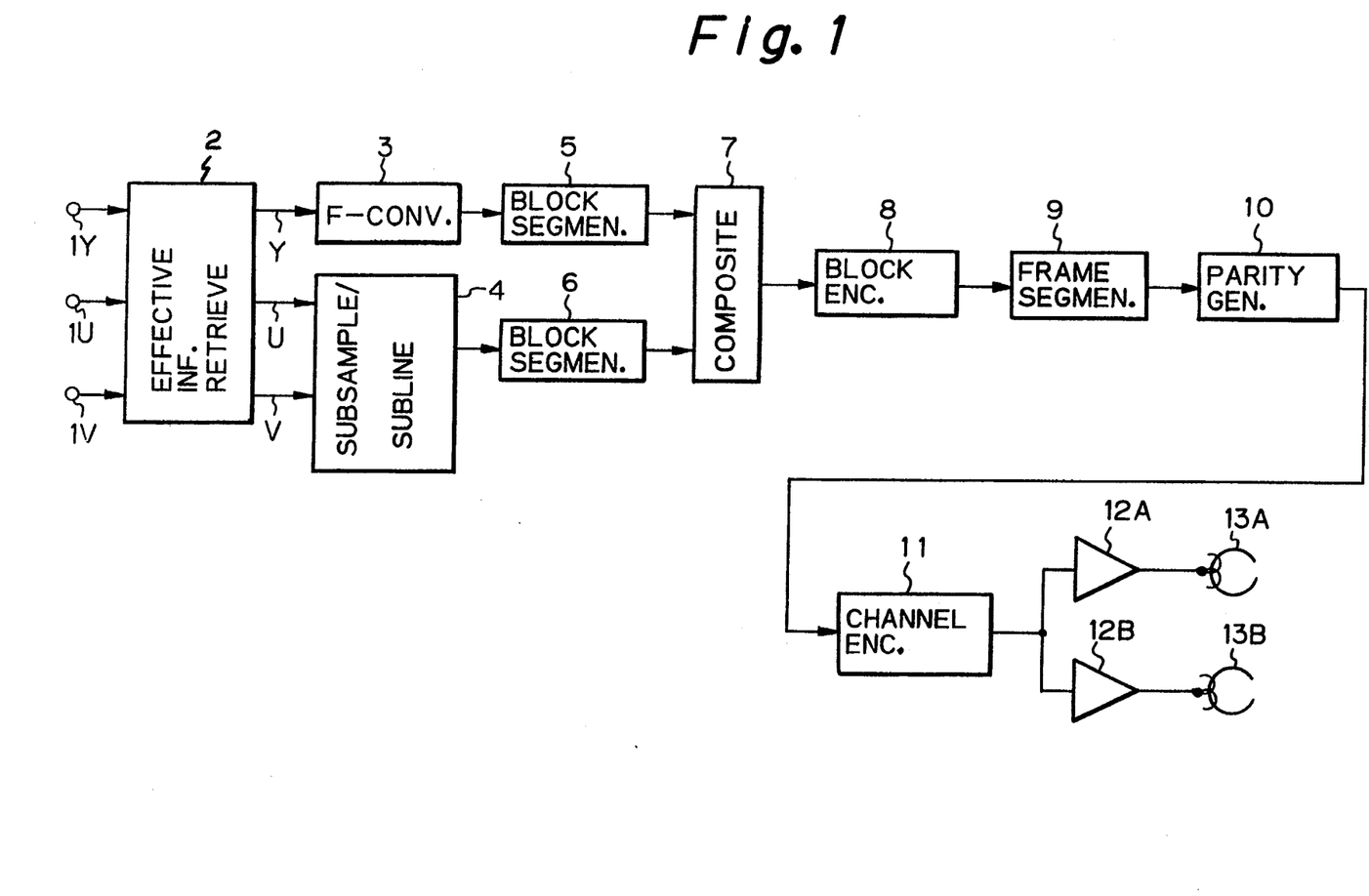
FIG. 1 is a block diagram showing a construction on a record side of a signal process portion of an embodiment according to the present invention.

FIG. 1 is an overall view of a signal process portion of a digital VTR of an embodiment according to the present invention. A digital luminance signal Y and digital color difference signals U and V, which are formed by three primary color signals R, G, and B, are sent to input terminals 1Y, 1U, and 1V. The three primary color signals R, G, and B are output from for example a color video camera. In this case, the clock rates of respective signals are the same as the frequencies of the component signals in the above mentioned D1 format. In other words, the sampling frequencies are 13.5 MHz and 6.75 MHz and the number of bits per sample is 8 bits. Thus, the data amount of the signals sent to the input terminals 1Y, 1U, and 1V are approximately 216 Mbps as was described earlier. An effective information retrieval circuit 2 for removing data from the signals only during the blanking intervals and for retrieving only information in the effective area compresses the data amount to approximately 167 Mbps. The luminance signal Y of an output of the effective information retrieval circuit 2 is sent to a frequency conversion circuit 3. The frequency conversion circuit 3 converts the sampling frequency from 13.5 MHz into ¾-th thereof. With respect to the frequency conversion circuit 3, for example a thin-out filter is used so as to prevent reflected distortion from taking place. The output signal of the frequency conversion circuit 3 is sent to a block segmentation circuit 5. The block segmentation circuit 5 converts the sequence of the luminance data into the sequence of blocks. The block segmentation circuit 5 is provided for a block encoding circuit 8 disposed at a later stage thereof.

Figure 3:
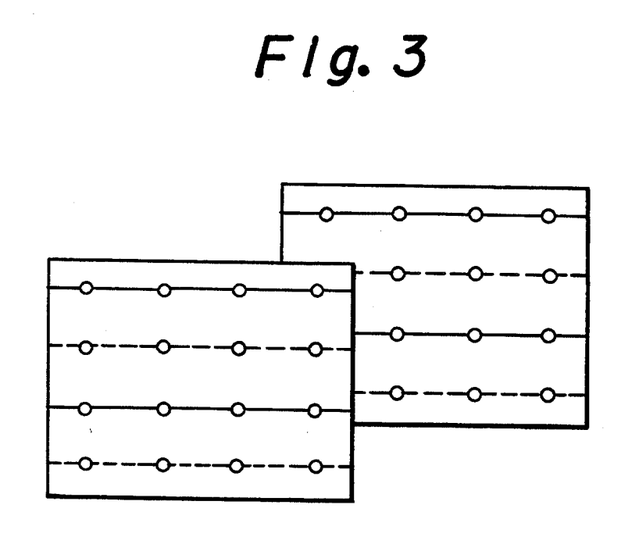
FIG. 3 is a schematic diagram showing an example of a block for block encoding.

FIG. 3 is a schematic diagram showing a construction of blocks which are used as an encoding unit. FIG. 3 shows an example of three-dimensional blocks. By dividing a screen which occupies for example two frames, as shown in FIG. 3, a large number of unit blocks (4 lines × 4 picture elements × 2 frames) are formed. In the figure, the solid lines represent lines of odd fields, while the broken lines represent lines of even fields.

Figure 4:
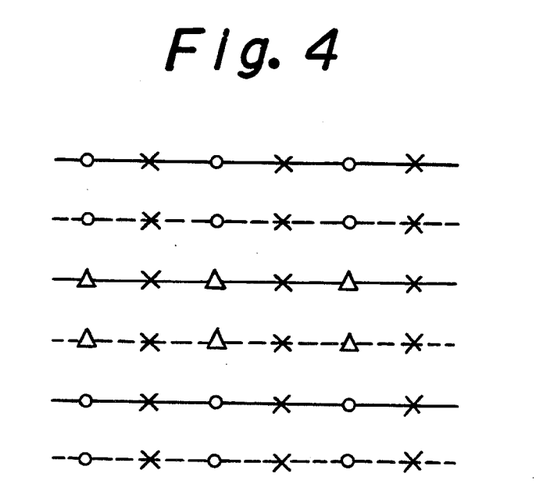
FIG. 4 is a schematic diagram describing a subsampling and a subline.

On the other hand, the two color difference signals U and V, which are remaining outputs of the effective information retrieval circuit 2, are sent to a subsampling and subline circuit 4. The subsampling and subline circuit 4 converts the sampling frequency from 6.75 MHz into the half thereof and then selects the two digital color difference signals one after the other for each line. Thereafter, the subsampling and subline circuit 4 composites the two digital color difference signals into data in one channel and thereby outputs a line sequence digital color difference signal. FIG. 4 shows a construction of picture elements of the signal which are sub-sampled and sub-lined by the circuit 4. In the figure, "O" represents a sampling picture element of the first color difference signal U; "△" represents a sampling picture element of the second color difference signal V; and "X" represents a position of a picture element being thinned out by the sampling.

The output line sequence signal of the subsampling and subline circuit 4 is sent to a block segmentation circuit 6. Like the block segmentation circuit 5, the block segmentation circuit 6 converts scanning sequence color difference data of television signals into block sequence data. Like the block segmentation circuit 5, the block segmentation circuit 6 converts the color difference data into data in a block construction (4 lines×4 picture elements×2 frames). The output signals of the block segmentation circuits 5 and 6 are sent to a composite circuit 7.

The composite circuit 7 converts the luminance signal and the color difference signal which have been converted into block sequence signals into data in one channel. The output signal of the composite circuit 7 is sent to the block encoding circuit 8. With respect to the block encoding circuit 8, as will be described later in detail, an encoding circuit adaptable to the dynamic range of each block (the circuit is named the ADRC), DCT (Discrete Cosine Transform) circuit, or the like can be used. The output signal of the block encoding circuit 8 is sent to a frame segmentation circuit 9. The frame segmentation circuit 9 converts the signal into data in a frame construction. The frame segmentation circuit 9 exchanges between a picture system clock and a record system clock.

The output signal of the frame segmentation circuit 9 is supplied to a parity generation circuit 10 of an error correction code. The parity generation circuit 10 generates a parity of an error correction code. The output signal of the parity generation circuit 10 is supplied to a channel encoder 11, and the channel encoder 11 performs a channel encoding so that the low band of the record data is decreased. The output signal of the channel encoder 11 is supplied to magnetic heads 13A and 13B through respective recording amplifiers 12A and 12B and rotation transformers (not shown) and then recorded on the magnetic tape.

Although not shown, the audio signal is compressed and encoded apart from the video signal, and supplied to the channel encoder.

With the above mentioned signal processes, by retrieving the input data amount of 216 Mbps only during blanking intervals, it is decreased to approximately 167 Mbps. In addition, with the frequency conversion and the sub-sample and sub-line process, the resultant data amount is decreased to 84 Mbps. After the resultant data is compressed and encoded by the block encoding circuit 8, the data amount is compressed to approximately 25 Mbps. Thereafter, by adding additional information such as a parity and an audio signal to the resultant compressed data, the recording data amount becomes approximately 31.5 Mbps.

Then, with reference to FIG. 2, the construction of the playback side will be described.

Figure 2:
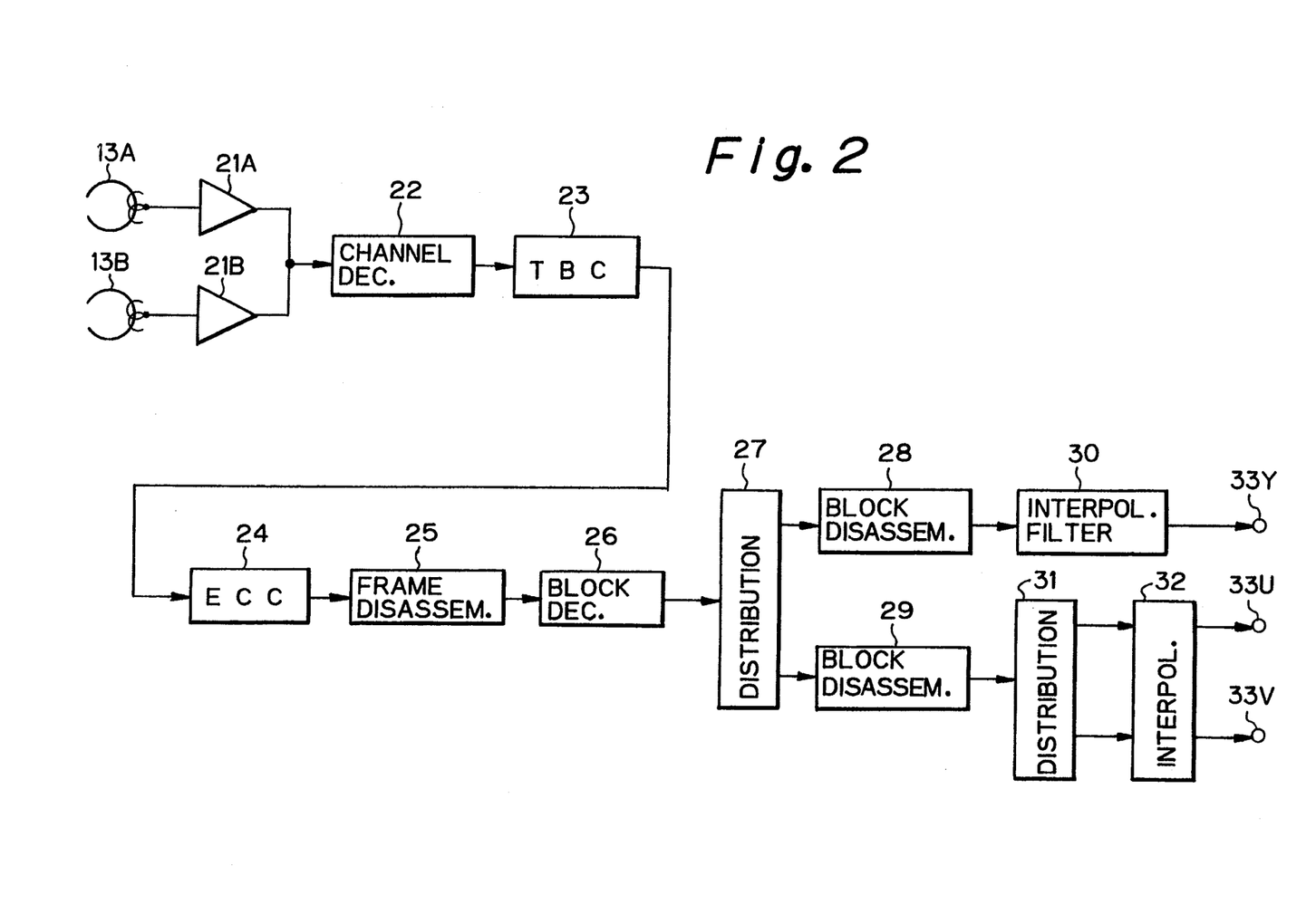
FIG. 2 is a block diagram showing a construction on a playback side of the signal process portion.

In FIG. 2, playback data from the magnetic heads 13A and 13B are given to a channel decoder 22 through the rotation transformers (not shown) and playback amplifiers 21A and 21B. The channel decoder 22 demodulates channel encoded data. The output signal of the channel decoder 22 is sent to a TBC circuit (time base compensation circuit) 23. The TBC circuit 23 removes time base fluctuating components of the playback signal. The playback data which is output from the TBC circuit 23 is fed to an ECC circuit 24. The ECC circuit 24 correct and modify errors by using error correction code. The output signal of the ECC circuit 24 is given to a frame disassembling circuit 25.

The frame disassembling circuit 25 separates each component of block encoded data of the picture data and exchanges between the recording system clock and the picture system clock. Each data separated in the frame disassembling circuit 25 is supplied to a block decoding circuit 26. The block decoding circuit 26 decodes data in accordance with original data for each block. The decoded data is supplied to a distribution circuit 27. The distribution circuit 27 separates a luminance signal and a color difference signal from the decoded data. The luminance signal and the color difference signal are fed to the block disassembling circuits 28 and 29, respectively. The block disassembling circuits 28 and 29 convert the block sequence signals into the raster scanning sequence signals as opposed to the block segmentation circuits 5 and 6 on the transmission side.

The decoded luminance signal which is output from the block disassembling circuit 28 is supplied to an interpolation filter 30. The interpolation filter 30 converts the sampling rate of the luminance signal from 3 fs into 4 fs (where 4 fs=13.5 MHz). The digital luminance signal Y which is output from the interpolation filter 30 is retrieved from an output terminal 33Y.

On the other hand, the digital color difference signal which is output from the block disassembling circuit 29 is sent to a distribution circuit 31. The distribution circuit 31 separates digital color difference signals U and V from the line sequence digital color difference signals U and V. The separated digital color difference signals U and V which are output from the distribution circuit 31 are sent to an interpolation circuit 32, and interpolated. The interpolation circuit 32 interpolates with the decoded picture element data the line and picture element data which have been thinned out. The interpolation circuit 32 outputs the digital color difference signals U and V whose sampling rate is 4 fs. These digital color difference signals U and V are retrieved from output terminals 33U and 33V, respectively.

b. Block encoding

With respect to the block encoding circuit 8 shown in FIG. 1, the ADRC (Adaptive Dynamic Range Coding) encoder which has been disclosed in Japanese Patent Application Serial Nos. SHO 59-266407, SHO 59-2698666, and so forth filed by the applicant of the present patent application. The ADRC encoder detects the maximum value MAX and the minimum value MIN of data of a plurality of picture elements contained in each block and then detects a dynamic range DR of the block therefrom. Thereafter, the ADRC encoder encodes the data in accordance with the dynamic range and then requantizes the data with bits which are smaller than those of the original picture element data. As another example of the block encoding circuit 8, the following construction may be used. First, the picture element data of each block is DCTed (Discrete Cosine Transformed) and then coefficient data obtained by the DCT process is quantized. Thereafter, the quantized data is compressed by the run-length Hoffman encoding process.

Then, with reference to FIG. 5, an example of an encoder where the ADRC encoder is used and picture quality is not degraded by multiple dubbing operations will be described.

Figure 5:
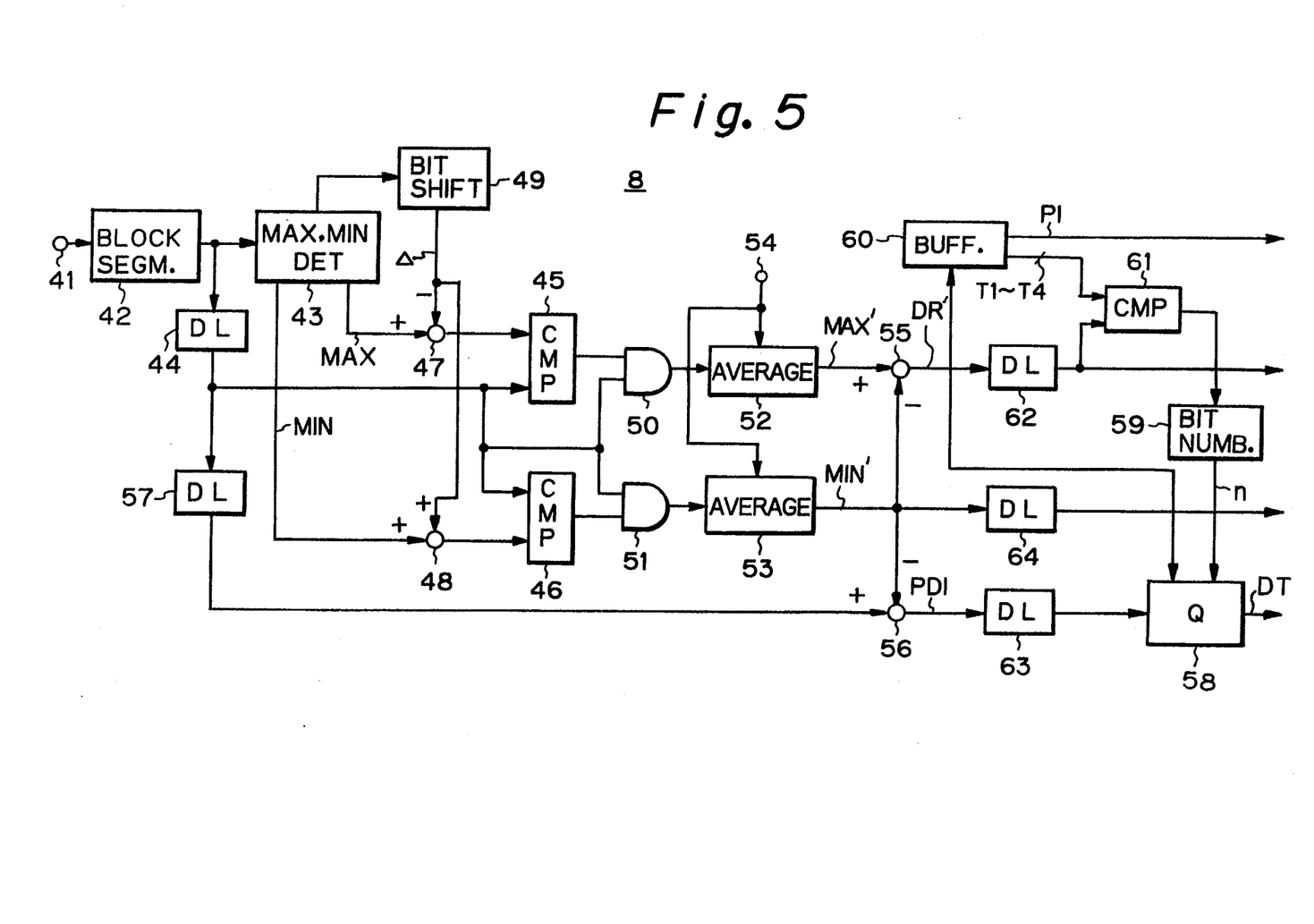
FIG. 5 is a block diagram showing an example of a block encoding circuit.

In FIG. 5, a digital video signal (or a digital color difference signal) where 1 sample is quantized to 8 bits is input from the composite circuit 7, which is shown in FIG. 1, to an input terminal 41.

The block segmentation data from the input terminal 41 is sent to a maximum value and minimum value detection circuit 43 and a delay circuit 44. The maximum value and minimum value detection circuit 43 detects the minimum value MIN and the maximum value MAX for each block. The delay circuit 44 delays the input data for a time period necessary for detecting the maximum value and the minimum value. The picture element data which is output from the delay circuit 44 is sent to comparison circuits 45 and 46.

The maximum value MAX which is output from the maximum value and minimum value detection circuit 43 is given to a subtraction circuit 47. On the other hand, the minimum value MIN which is output from the maximum value and minimum value detection circuit 43 is supplied to an addition circuit 48. The value of one quantized step width ($\Delta = 1/16$ DR) where non-edge matching quantization is performed with a fixed length of 4 bits is sent from a bit shift circuit 49 to the subtraction circuit 47 and the addition circuit 48. In the bit shift circuit 49, the dynamic range DR is shifted by 4 bits so as to perform a deviation of (1/16). The subtraction circuit 47 outputs a threshold value of (MAX$-\Delta$). On the other hand, the addition circuit 48 outputs a threshold value of (MIN$+\Delta$). The threshold values which are output from the subtraction circuit 47 and the addition circuit 48 are sent to the comparison circuits 45 and 46, respectively.

The value $\Delta$ which determines the threshold values may be a fixed value equivalent to a noise level besides the quantizing step width.

The output signal of the comparison circuit 45 is supplied to an AND gate 50. On the other hand, the output signal of the comparison circuit 46 is sent to an AND gate 51. The input data of the delay circuit 44 is supplied to the AND gates 50 and 51. The output signal of the comparison circuit 45 becomes high when the level of the input data is larger than that of the threshold value. Thus, the picture element data of the input data in the maximum level range of (MAX to MAX$-\Delta$) is output from the output terminal of the AND gate 50. On the other hand, the output signal of the comparison circuit 46 becomes high when the level of the input data is smaller than that of the threshold value. Thus, the picture element data of the input data in the minimum level range of (MIN to MIN$+\Delta$) is output from the output terminal of the AND gate 51.

The output signal of the AND gate 50 is fed to an averaging circuit 52, and the output signal of the AND gate 51 is sent to an averaging circuit 53. These averaging circuits 52 and 53 calculate an average value of each block. A reset signal with a block interval is sent from a terminal 54 to the averaging circuits 52 and 53. The averaging circuit 52 outputs an average value MAX' of picture element data in the maximum level range of (MAX to MAX$-\Delta$). On the other hand, the averaging circuit 53 outputs an average value MIN's of the picture element data in the minimum level range of (MIN to MIN$+\Delta$). A subtraction circuit 55 subtracts the average value MIN' from the average value MAX' and outputs a dynamic range DR'.

The average value MIN' is supplied to a subtraction circuit 56. The subtraction circuit 56 subtracts the average value MIN' from an input data through the delay circuit 57. The subtraction circuit 56 outputs data PD1 where the minimum value is removed. The data PD1 and the adjusted dynamic range DR' are sent to a quantizing circuit 58. In this embodiment, the ADRC with variable length where the number of bits assigned for quantization is one of 0 bit (no code signal transmission), 1 bit, 2 bits, 3 bits, and 4 bits is used and the edge matching quantizing operation is performed. The number of bits assigned is determined by a bit number determination circuit 59 for each block. The data of the bit number n is sent to the quantizing circuit 58.

In the ADRC with variable length, for a block where the dynamic range DR' is small, the bit number n is decreased, while for a block where the dynamic range DR' is large, the bit number n is increased. Thereby, the encoding operation can be effectively performed. In other words, when a threshold value for determining the bit number n is T1 to T4 (where T1<T2<T3<T4), for a block of (DR'<T1), the code signal is not transmitted, but only information of the dynamic range DR' is transmitted. For a block of (T1$\leq$DR'<T2), (n=1) is assigned. For a block of (T2$\leq$DR'<T3), (n=2) is assigned. For a block of (T3$\leq$DR'<T4), (n=3) is assigned. For a block of (DR'$\geq$T4), (n=4) is assigned.

In the ADRC with variable length, by varying the threshold values T1 to T4, the amount of information which generates can be controlled (namely, the information can be buffered). Thus, even for a transmission path such as a digital VTR according to the present invention where the amount of information which generates has to be set to a particular value, the ADRC with variable length can be applied.

In FIG. 5, reference numeral 60 is a buffering circuit for determining the threshold values T1 to T4 for setting the amount of information which generates to a particular value. The buffering circuit 60 has a plurality of sets of threshold values (T1, T2, T3, T4) for example 32 sets. The sets of the threshold values are identified by a parameter code Pi (where i=0, 1, 2, ..., 31). As the number i of the parameter code Pi becomes large, the amount of information which generates is linearly decreased. However, as the amount of information which generates decreases, the quality of picture being restored degrades.

The threshold values T1 to T4 which are output from the buffering circuit 60 are supplied to a comparison circuit 61. The dynamic range DR' is fed to the comparison circuit 61 through a delay circuit 62. The delay circuit 62 delays DR' for a time period necessary for the buffering circuit 60 to determine a set of the threshold values. The comparison circuit 61 compares the dynamic range DR' of the block with each threshold value. The compared output is sent to the bit number determination circuit 59. The bit number determination circuit 59 determines the number of bits to be assigned for the block. The quantizing circuit 58 converts the data PDI, where the minimum value has been removed, into a code signal DT by the edge matching quantizing operation with the dynamic range DR' and the bit number n being assigned. The quantizing circuit 58 is constructed with for example a ROM.

The dynamic range DR' and the average value MIN' which are adjusted through the respective delay circuits 62 and 64 are output. In addition, a parameter code Pi representing the code signal DT and the set of threshold values is output. In this example, since a signal which has been quantized in non-edge matching is requantized in edge matching in accordance with the information of dynamic range, it is considered that the degradation of pictures being dubbed is small.

c. Channel encoder and channel decoder

Then, the channel encoder 11 and the channel decoder 22 shown in FIG. 1 will be described. Although practical constructions of these circuits are described in Japanese Patent Application Serial No. HEI 1-143491 filed by the applicant of the present application, they will be outlined with reference to FIGS. 6 and 7.

Figure 6:
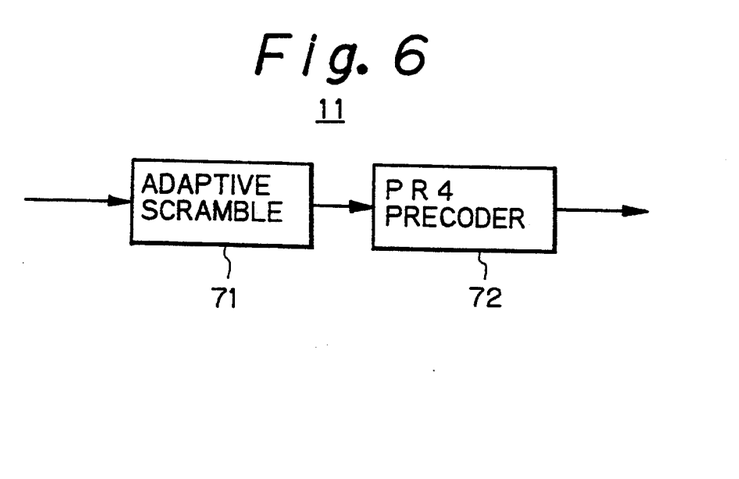
FIG. 6 is a block diagram outlining an example of a channel encoder.

In FIG. 6, reference numeral 71 is an adaptive type scramble circuit AA, such as that described in U.S. Pat. No. 5,122,912, to which the output of the parity generation circuit 10 in FIG. 1 is supplied. In this case, a plurality of M system scramble circuits are provided. One is selected from the plurality of M system scramble circuits so that the high frequency component and the DC component are smallest in therein with respect to the input signal. Reference numeral 72 is a partial response class 4 detection type precoder. The precoder 72 calculates $1/1-D^2$ (where D is a unit delay circuit). The precoder output is recorded and playbacked by the magnetic heads 13A and 13B through the record amplifiers 12A and 12B, respectively. The playback output is amplified by the playback amplifiers 21A and 21B.

Figure 7:
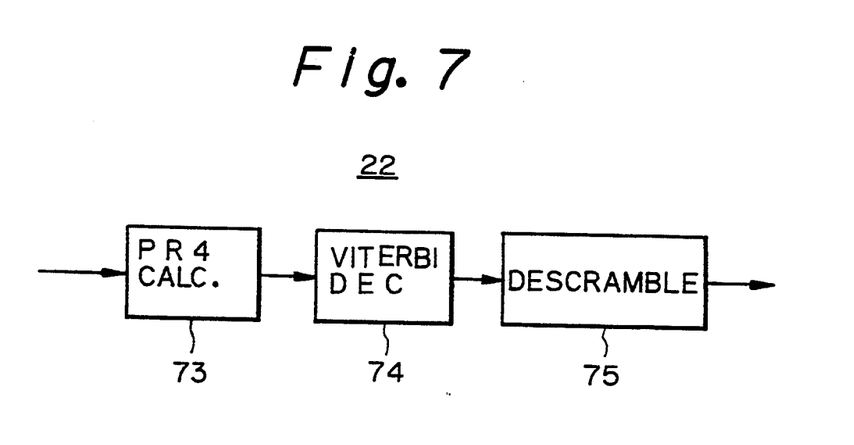
FIG. 7 is a block diagram outlining an example of a channel decoder.

In FIG. 7 which shows the construction of the channel decoder 22, reference numeral 73 is a partial response class 4 calculation process circuit on the playback side. The circuit 73 calculates $1+D$ in accordance with the outputs of the playback amplifiers 21A and 21B. Reference numeral 74 is a Viterbi decoding circuit. The circuit 74 calculates the output of the calculation process circuit 73 with respect to its correlation and probability and thereby decodes data which has high noise resistance. The output of the Viterbi decoding circuit 74 is sent to a descrambling circuit 75. The descrambling circuit 75 restores the original data from the scrambled data which was scrambled on the record side. With the Viterbi decoding circuit 74 used in the embodiment, the playback C/N is improved by 3 dB than that in the decoding for each bit.

d. Head and tape system

Figure 8A:
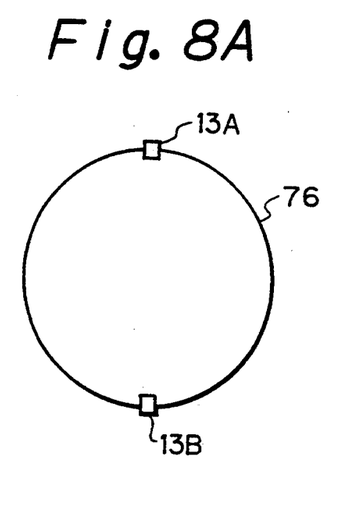
FIGS. 8A and 8B are schematic diagrams describing head locations.
Figure 8B:
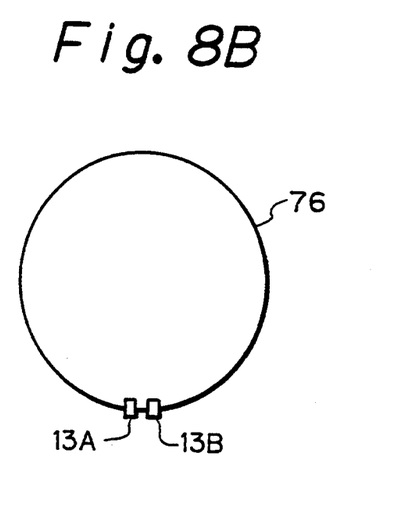

As shown in FIG. 8A, the magnetic heads 13A and 13B described before are mounted in the opposed positions at an interval of 180° on a rotation drum 76. As another method, as shown in FIG. 8B, the magnetic heads 13A and 13B are mounted on the drum 76 in a unified construction. On the peripheral surface of the drum 76, a magnetic tape (not shown in the figure) is obliquely wound at a winding angle of 180° or slightly larger or smaller. In the head locations shown in FIG. 8A, the magnetic heads 13A and 13B are alternately contacted with the magnetic tape. On the other hand, in the head locations shown in FIG. 8B, both the magnetic tapes 13A and 13B scan the magnetic tape at the same time.

Figure 9:
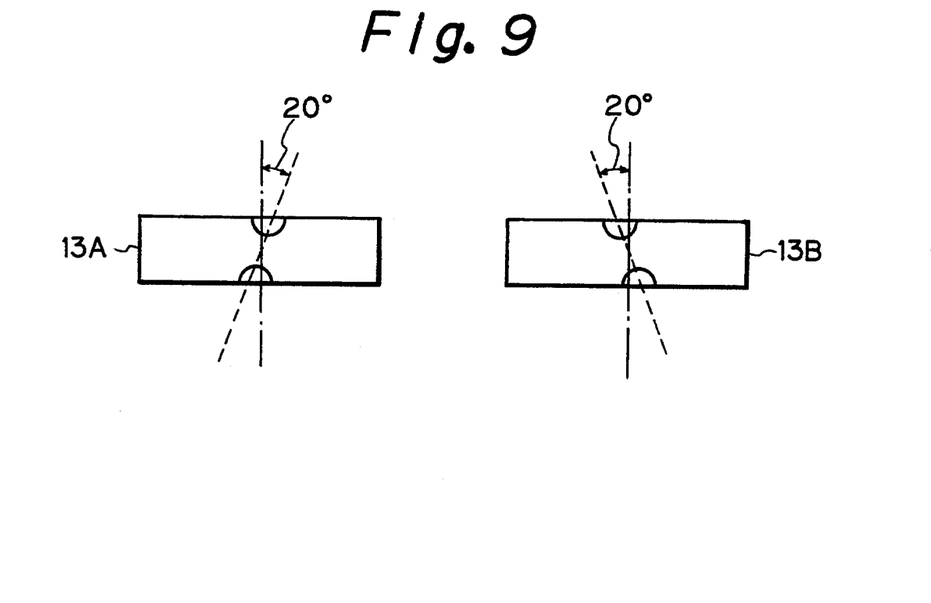
FIG. 9 is a schematic diagram describing azimuths of heads.
Figure 10:
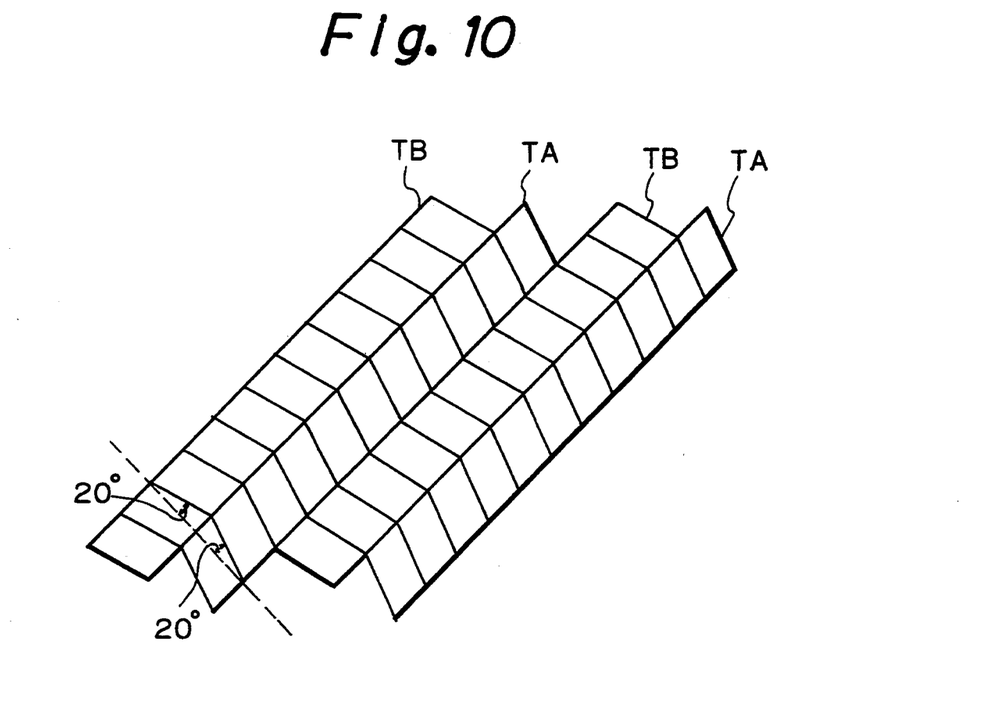
FIG. 10 is a schematic diagram describing a record pattern.

The directions of the gaps of the magnetic heads 13A and 13B differ each other. These angles made by these directions are named azimuth angles. For example, as shown in FIG. 9, azimuth angles of ±20° are set to the magnetic heads 13A and 13B. Depending on the difference of the azimuth angles, a record pattern as shown in FIG. 10 is formed on the magnetic tape. As shown in FIG. 10, adjacent tracks TA and TB on the magnetic tape are formed by the respective magnetic heads 13A and 13B, which have different azimuth angles. Thus, when the magnetic tape is playbacked, due to an azimuth loss, the cross talk amount between adjacent tracks can be decreased.

Figure 11A:
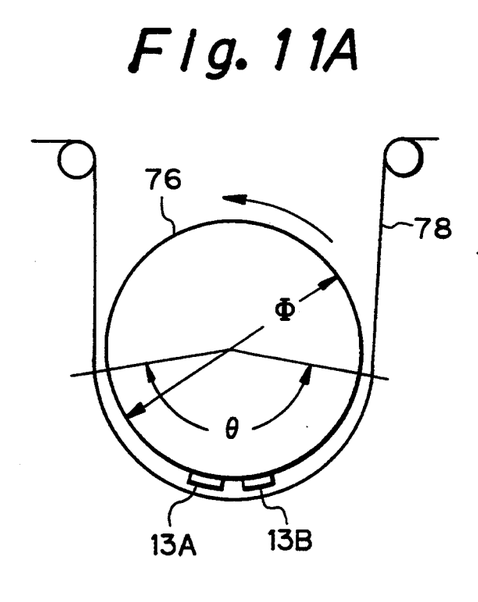
FIGS. 11A and 11B are top and side views showing an example of a tape and head system.
Figure 11B:
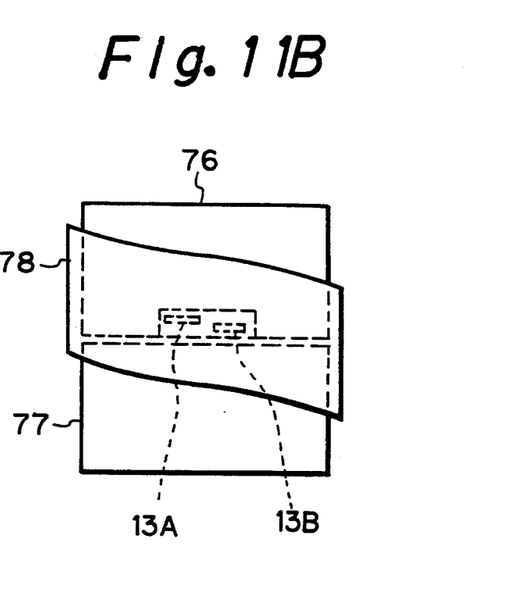

FIGS. 11A and 11B show a more practical construction where the magnetic heads 13A and 13B are unified (so-called double azimuth head). For example, while the unified magnetic heads 13A and 13B are mounted on an upper drum 76 which is rotated at a high speed of 150 rps (in the NTSC system), a lower drum 77 is fixed. Thus, data of one field is recorded on five tracks. By using this segment system, the length of the tracks can be decreased. In addition, a track linearity error can be decreased. The winding angle $\theta$ of the magnetic tape 78 is set to 166° and the drum system $\phi$ is set to 25 mm or less, for example, 16.5 mm.

When a person intend to realize narrow track pitch recording such 5.5 $\mu$m, the mechanical error of head and drum system which affect mechanical interchangeability are the error of static track linearity, the error of dynamic tracking linearity and the error of pairing the heads 13A and 13B.

The error of static track linearity is caused by nonlinearity of a lead on the drum, misalignment of the tape path and an inclination of the rotational axis of the drum. The nonlinearity of the lead and the misalignment of the tape path relate with the track length, and the inclination of the rotational axis relates with the drum diameter. More specifically, the tracking factor which indicates the static track linearity is proportional to the track pitch and is in inverse proportion to the product of the track length and the drum diameter. In the above mentioned example, since the drum diameter is reduced from 40 mm to 16.5 mm, the track length is reduced from 74 mm to 26 mm in comparison with the conventional 8 mm VTR, the tracking factor more than that of the 8 mm VTR can be obtained even though the track pitch is made small value such 5.5 $\mu$m. That is, it is prevented to increase the error of the static track linearity compared with the conventional device.

Figure 12A:
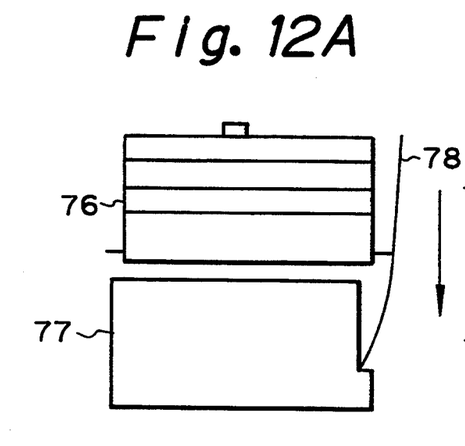
FIGS. 12A and 12B are schematic diagrams describing that eccentricity of the drum results in vibration of the tape.
Figure 12B:
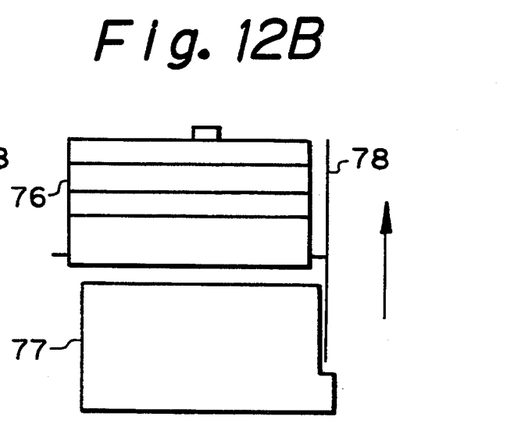

In addition, by using the double azimuth head, simultaneous recording is performed. Normally, due to eccentricity or the like of the rotating portion of the upper drum 76, the magnetic tape 78 vibrates and thereby the track linearity error takes place. As shown in FIG. 12A, the magnetic tape 78 is pressed downwardly. In addition, as shown in FIG. 12B, the magnetic tape 78 is pulled out upwardly. Thus, the magnetic tape 78 vibrates and thereby the track linearity degrades. However, in this construction, since the simultaneous recording is performed with the double azimuth head, the linearity error can be more decreased than that where the magnetic heads in pair are oppositely disposed at an interval of 180°. In addition, with respect to the double azimuth head, the distance between the heads is small. Thus, the pairing can be more accurately adjusted than that of the other. By using the above mentioned tape and head system, tracks with a narrow width can be recorded and playbacked.

Thus, since the error occurred in the tape and head system can be reduced, the small track pitch such 5.5 $\mu$m can be realized.

e. Electromagnetic conversion system

Then, an electromagnetic conversion system used in the present invention will be described.

A magnetic tape as a recording medium is produced in the following method or the like.

A solution containing an emulsion whose principal component is an acrylic acid latex is coated on a base composed of a 7 $\mu$m thick polyethylene phthalate (PET). Thereafter, the base is dried and thereby fine projections made of the emulsion particles are formed.

By the above mentioned process, with respect to the surface roughness of the base, the average roughness of center line, Ra, was 0.0015 μm and the density of the fine projections was approximately 5,000,000 particles/mm².

Figure 13:
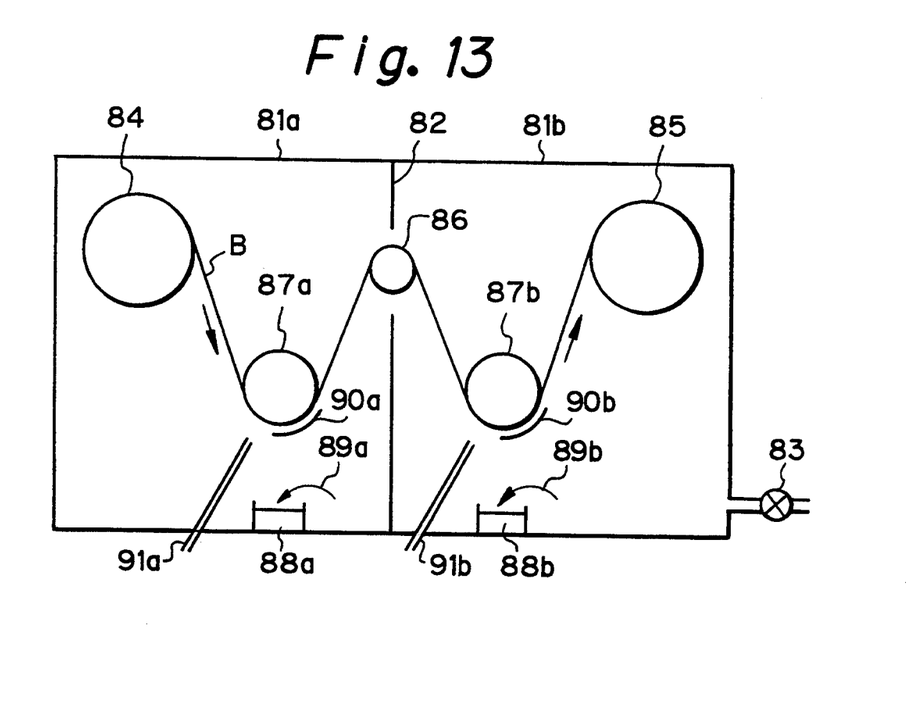
FIG. 13 is a schematic diagram describing a method of producing a magnetic tape.

Thereafter, by using a vacuum deposition unit shown in FIG. 13, a magnetic layer whose principal component is Co is formed on the base in an oxygen atmosphere by slant deposition method.

In FIG. 13, reference numerals 81a and 81b are vacuum tanks. Reference numeral 82 is a partitioning plate. Reference numeral 83 is a vacuum exhaust valve. Reference numeral 84 is a supply roll of a base B. Reference numeral 85 is a take-up roll. Reference numeral 86 is a guide roll. Reference numerals 87a and 87b are cylindrical cooling cans for guiding the base B. Reference numerals 88a and 88b are evaporation sources of Co. Reference numerals 89a and 89b are electron beams for heating the evaporation sources 88a and 88b, respectively. Reference numerals 90a and 90b are insulating plates for restricting incident angles of the evaporation beams to the base B. Reference numerals 91a and 91b are oxygen gas supply pipes.

In the vacuum deposition unit in the above mentioned construction, the base B is traveled in the order of the supply roll 84, the cooling can 87a, the guide roll 86, the cooling can 87b, and the take-up roll 85. At that time, a magnetic layer composed of two Co layers is formed in the oxygen atmosphere of the cooling cans 87a and 87b by the slant deposition method.

This vacuum deposition is performed in the following manner. While the vacuum tanks 81a and 81b are kept to a vacuum degree of $1 \times 10^{-4}$ Torr, oxygen gas is supplied to the vacuum tanks 81a and 81b through the respective supply pipes 91a and 91b at a supply speed of 250 cc/min. In this case, the incident angle of the evaporation beam to the base B is in the range from 45° to 90°. In addition, the Co layers are deposited in the respective cooling cans 87a and 87b so that their thickness becomes 1000 Å and thereby the overall thickness of the magnetic layer becomes 2000 Å.

A back coat composed of carbon and an epoxy binder and a top coat which is a lubricant composed of perfluoro polyester are formed on the base B where the magnetic layer composed of two Co layers is formed. Thereafter, the base B is cut at a width of 8 mm so as to produce the magnetic tape.

As the characteristics of the magnetic tape lastly obtained, the residual magnetic flux density Br was 4150 G, the magnetic resisting force Hc=1690 Oe, and Rs was 79%. With respect to the surface roughness of the magnetic tape, due to the surface roughness of the base B, the average roughness of center line, Ra, was as small as 0.0015 μm.

Although the surface roughness is conventionally measured in accordance with JIS B0601, this measurement was conducted in the following conditions.

Measurement equipment: TARYSTEP (made by LANKTAILOR)
Diameter of pointer: 0.2×0.2 μm, angular type
Pressure of pointer: 2 mg
High-pass filter: 0.33 Hz FIG. 14 shows a recording magnetic head used in the present invention.

Figure 14:
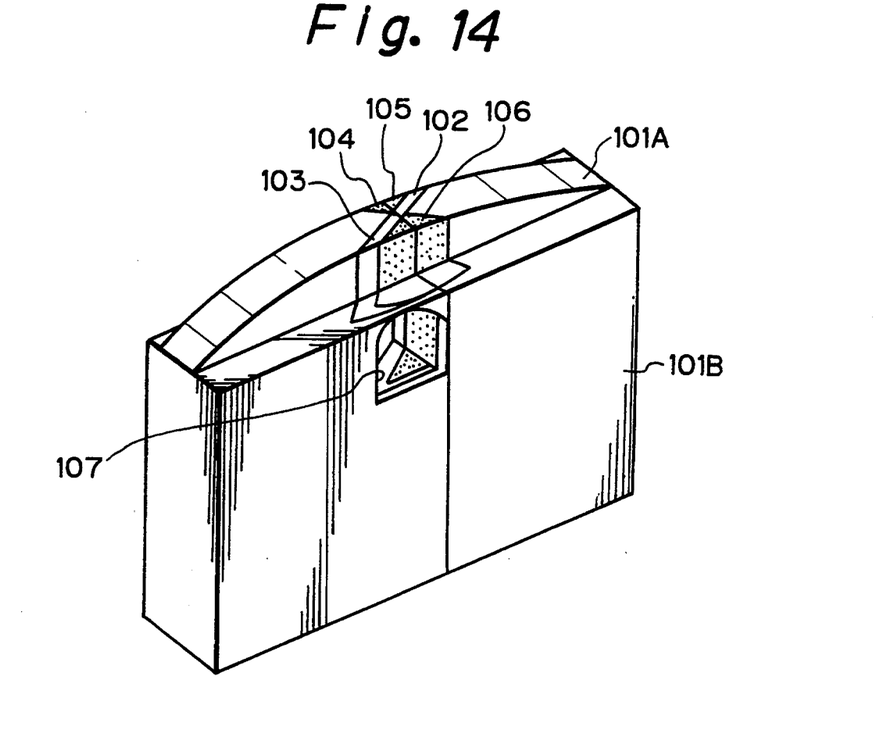
FIG. 14 is a perspective view showing an example of a construction of a magnetic head.

As shown in FIG. 14, this magnetic head has a gap 104 between Fe-Ga-Si-Ru type soft magnetic layers 102 and 103 formed on single crystal Mn-Zn ferrite cores 101A and 101B by the sputter method. On both the sides in the direction of the track width of the gap 104, glasses 105 and 106 are filled. Thus, the track width is limited to approximately 4 μm. Reference numeral 107 is a coil hole. A recording coil (not shown in the figure) is wound in the coil hole 107. The effective gap length of the magnetic head is 0.20 μm.

Since this magnetic head uses the Fe-Ga-Si-Ru type soft magnetic layers 102 and 103 whose saturated magnetic flux density Bs is 14.5 kG in the vicinity of the gap 104, this magnetic head can record data on a magnetic tape having a high magnetic resisting force without magnetic saturation of the head.

By using the above mentioned ME tape and the magnetic head, a record density of 1.25 μm²/bit or less can be achieved.

In other words, as was described above, by recording a signal with the shortest waveform of 0.5 μm on a 5 μm wide track, a record density of 1.25 μm²/bit can be achieved. However, it is known that as the recording wavelength and the track width decrease the playback output degrades. To suppress such a degradation, the above mentioned tape and the head have been used.

The applicant of the present invention produced a prototype digital VTR with a 8 mm ME tape where the track pitch was 15 μm and the shortest waveform was 0.5 μm in 1988. At that time, a rotating drum with a diameter of 40 mm was used and rotated at a speed of 60 rpm so as to record and playback data. In this system, a C/N of 51 dB was obtained with a record wavelength of 1 μm. The bit error rate of the system was $4 \times 10^{-5}$.

As with the embodiment of the present invention, when a track with a width of 5 μm is used, the C/N obtained is only approximately 44 dB in the same specifications and thereby the picture quality is degraded. To compensate the degradation of the C/N by 7 dB, the above mentioned construction according to the present invention is used.

In other words, it is known that as the space between the tape being recorded or playbacked and the head becomes large, the signal output level decreases. In addition, it is also known that the amount of the space depends on the flatness of the tape. Moreover, it is known that in the case of a coated type tape the flatness of the tape depends on the coating agent in use, while in the case of a deposited tape, the flatness of the tape depends on that of the base itself. In the above mentioned embodiment, as an experimental result, when as flat the surface roughness of the base film as possible was selected, the C/N was increased by 1 dB. In addition, by using the deposition material and the deposition method of the above mentioned embodiment, as an experimental result, the C/N was improved by 3 dB for the tape used in the prototype production in 1988. Thus, by using the head and the tape according to the present invention, the C/N is improved by 4 dB for the former prototype machine.

In addition, in this embodiment, since the Viterbi channel decoding is used, an increase of 3 dB in the decoding for each bit used in the former prototype machine was confirmed.

Thus, it is possible to compensate the degradation of the C/N by 7 dB in total. At a recording density of 1.25 μm²/bit, the error rate same as that of the prototype machine produced in 1988 is obtained. With respect to the playback output, the error rate in the stage preceding the correction process of the error correction code should be $10^{-4}$ or less. When an error correction code with a redundancy of around 20% is used, the error should be limited to the amount which can be corrected.

According to the present invention, the recording density is high since the digital picture signal can be recorded with a small track pitch. The present invention can perform a long time recording operation with a small size cassette. Furthermore, the mechanical portion is compact because of the small diameter of the rotational drum.

We claim:

1. A magnetic recording apparatus for a digital picture signal comprising a block segmenting circuit for segmenting fields of an input digital picture signal into data blocks each formed of a plurality of picture elements, an encoding circuit for compressing and encoding the data blocks of said block segmenting circuit, a channel encoding circuit for channel encoding the compressed and encoded data blocks from said encoding circuit to produce output data for recording on a magnetic tape, a magnetic head assembly mounted on a rotary drum for recording the output data of one field in a plurality of recording tracks on said magnetic tape, said recording tracks exhibiting a track pitch of no greater than 5.5 $\mu$m, said rotary drum having a diameter no greater than 25 mm and a rotary speed no less than 150 rps.

2. A magnetic recording apparatus according to claim 1, wherein said encoding circuit includes a DCT encoder.

3. A magnetic recording apparatus according to claim 1, wherein said channel encoding circuit comprises an adaptive scramble circuit.

4. A magnetic recording apparatus according to claim 1, wherein said channel encoding circuit comprises a partial response class 4 calculation pre-coder.

5. A magnetic recording apparatus according to claim 3, wherein said adaptive scramble circuit comprises a pluraltiy of M system scramble circuits and means for selecting one of said M system scramble circuits to produce the least high frequency component and DC component for an input digital picture signal.

* * * * *